United States Patent [19]
Mauro

[11] Patent Number: 5,881,445
[45] Date of Patent: Mar. 16, 1999

[54] METHOD OF PRODUCING MICRO-APERTURES IN OPTICALLY FLAT SURFACES AND STRUCTURES WHEN MADE BY THE METHOD

[76] Inventor: George Mauro, 26 Keewaydin Dr., Suite B, Salem, N.H. 03079

[21] Appl. No.: 903,334

[22] Filed: Jul. 30, 1997

[51] Int. Cl.⁶ .............................. B23P 13/04; B23H 5/00
[52] U.S. Cl. ........................ 29/558; 29/557; 219/69.17; 219/121.71
[58] Field of Search .......................... 29/890.1, 890.142, 29/558, 557; 219/69.17, 121.69, 121.71, 121.17, 121.18

[56] References Cited

U.S. PATENT DOCUMENTS

| | | | |
|---|---|---|---|
| 4,092,210 | 5/1978 | Hoepfner | 219/121.71 |
| 4,117,301 | 9/1978 | Goel et al. | 219/121.71 |
| 5,609,779 | 3/1997 | Crow et al. | 219/121.71 |

*Primary Examiner*—S. Thomas Hughes
*Assistant Examiner*—Jermie E. Cozart
*Attorney, Agent, or Firm*—Davis and Bujold

[57] ABSTRACT

A method of producing an aperture extending from an optically flat surface through a substrate defining the optically flat surface to a surface of the substrate remote from the optically flat surface comprising the steps of: a) forming the optically flat surface; b) etching to form the remote surface to produce an area of the substrate of a desired thinness bounded by the optically flat surface; and c) laser cutting through the area of desired thinness from the remote surface toward the optically flat surface to produce aperture, of a desired shape and size; and a structure when made by the method.

9 Claims, 1 Drawing Sheet

METHOD OF PRODUCING MICRO-APERTURES IN OPTICALLY FLAT SURFACES AND STRUCTURES WHEN MADE BY THE METHOD

The present invention relates to the formation of sharply defined apertures, especially micro-apertures, in an optically flat reflective surface defining one surface of a very thin area of a substrate and to a structure defining the optical surface and the aperture therein.

BACKGROUND OF THE INVENTION

In the past, it has been very difficult or impossible to produce small sharp edged apertures in an optically flat polished surface in a very thin section of a substrate without disturbing the optical flatness of the surface.

Typical of the prior art is a process which is very low in yield and quality and in which a substrate is polished on one side to produce an optically flat polished surface and then machined mechanically or by electron discharge machining (EDM) down almost to the polished surface from the opposite side of the substrate with the aperture subsequently being drilled through the remaining material. This machining leaves severe stresses which can damage and distort the polished surface and the thickness of the thin section in which the aperture is formed is limited. Additionally, using EDM causes extremely non-linear material removal and it is unreasonably difficult to achieve an appropriate thinness for the appropriate formation of the apertures.

The production of micro-apertures in an optically flat surface requires very thin unsupported sections which are too thin to be polished in such an unsupported form.

SUMMARY OF THE INVENTION

It is an object of the present invention to provide a method of effectively producing sharp edged micro-apertures of a desired cross-sectional size and shape extending through a very thin unsupported area of a substrate from an optically flat polished surface, while leaving the polished flat optical surface essentially undisturbed and uninterrupted except for the presence of the aperture.

A further object of the present invention is reliably, consistently and economically to produce micro-apertures extending through very thin sections from an optically polished flat surface without disturbing the characteristics of that surface.

According to the present invention there is provided a method capable of producing a micro-aperture extending from an optically flat surface through a substrate defining the optically flat surface to a surface of the substrate remote from the optically flat surface comprising the steps of: a) forming the optically flat surface; b) etching to form the remote surface to produce an area of the substrate of a desired thinness bounded by the optically flat surface and the remote surface; and c) laser cutting through the area of desired thinness to produce the aperture, of a desired shape and size. Preferably, prior to step a), a recess is machined in the substrate at the location of the area. Also preferably, prior to step a), the substrate is stress relieved to relieve machine stresses created during machining to form the recess. Also preferably, prior to step a), the recess in the stress relieved substrate is etched to remove machine mark stresses.

The recess may be machined in at least two stages commencing with a large relatively shallow recess having a bottom surface followed by at least one further machining step to produce at least one secondary and smaller recess in the bottom surface.

A removable material on the optically flat surface may be provided to receive residue from the laser cutting and this material would then be removed with the received residue thereby preserving the integrity of the optically flat surface adjacent the aperture.

The recess(es) may be frusto-conical.

The invention also provides a structure having an aperture extending from an optically flat surface through a substrate defining the optically flat surface to a surface of the substrate remote from the optically flat surface, when made by the aforementioned method according to the present invention.

BRIEF DESCRIPTION OF THE DRAWINGS

The invention will now be described, by way of example, with reference to the accompanying drawing, in which.

DETAILED DESCRIPTION OF THE INVENTION

Figure 1:
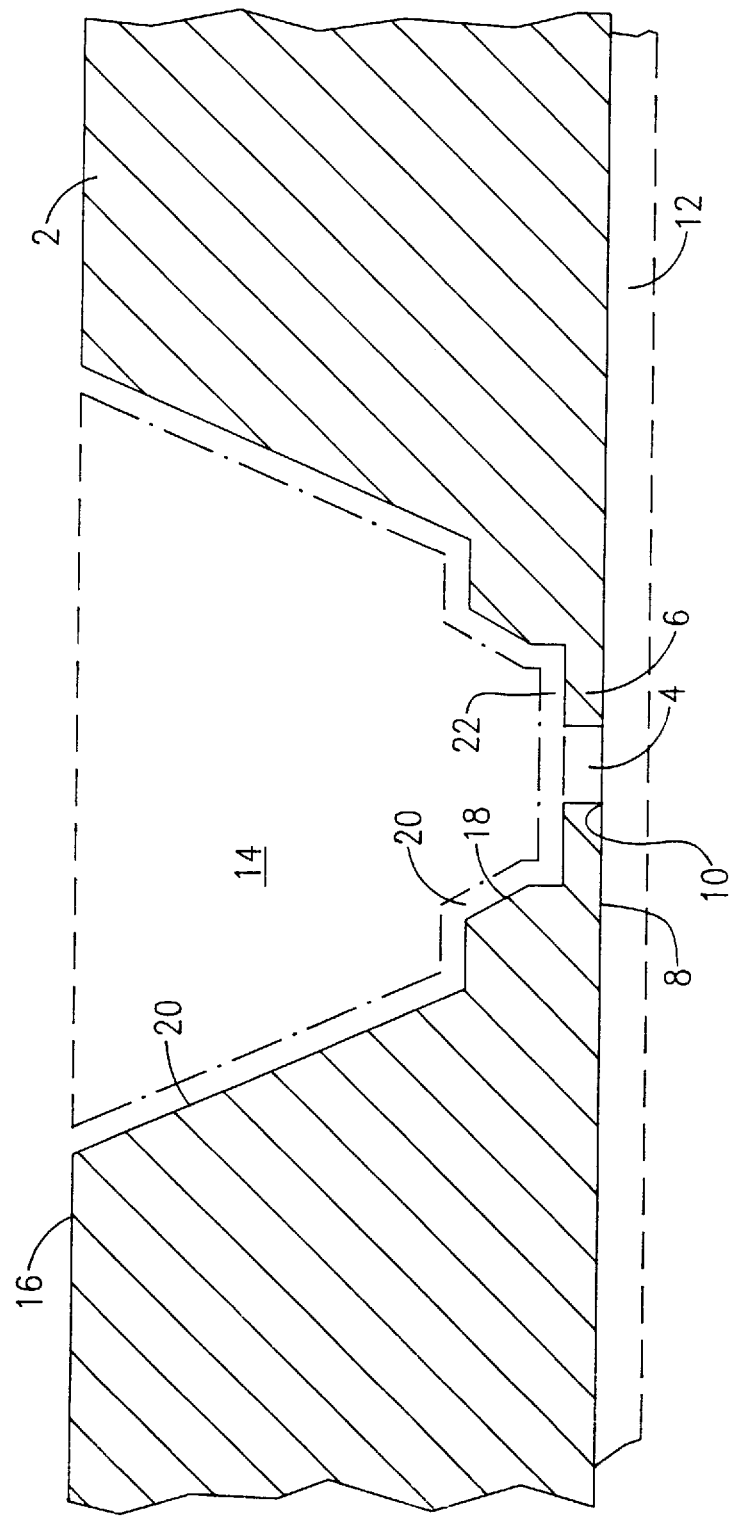
FIG. 1 is a fragmentary diagrammatic cross-section of a portion of a substrate having a very thin section through which extends an aperture to an optically flat polished surface.

With reference to FIG. 1, a substrate 2 composed of a single metal, bi-metal or tri-metal, etc., with or without plated surface(s) may be, for example copper. However, other materials are useful, for example, stainless steel or any other material which may be polished to produce an optically flat surface or which can carry a plating layer suitable for producing an optically flat surface as required by the intended application of the structure. The optically flat surface structures may be utilized in astronomical observations, and other space research applications, in which an apertured reflective surface is required. Although only one aperture is illustrated in FIG. 1, it will be appreciated that the structure concerned may have many such apertures and that these apertures may be sized and shaped as required for a particular application with consideration being given particularly to the wavelength of light which is to pass through the aperture. The aperture 4, illustrated, extends through a very thin section 6 of the substrate 2, adjacent an optically flat polished surface 8. The aperture 4 is defined by a clean sharp edge 10 where it meets the optically flat polished surface 8.

In this example, the aperture is of circular cross-section having a diameter from about 1 micron to about 6500 microns and typically of about 25 microns. The very thin section has a thickness of from about 1 micron to about 150 microns and typically of about 20 microns. These dimensions are controlled by the wavelength of light which will pass through the aperture, the dimensions being smaller for smaller wavelengths. As used herein, light shall be construed to include wavelengths outside of those regarded as visible light and may extend into the ultraviolet and infrared frequencies. The substrate 2 may have a thickness of from about ⅛ inch (3 mm) to ¼ inch (6 mm) and the very thin section 6 may have a diameter of from about 0.01 inch (0.25 mm) to about ½ inch (12 mm), depending upon the diameter of the aperture.

The method according to the present invention will now be described. Not all of the following method steps are necessary in all applications and certain steps may be omitted when appropriate.

Firstly, a surface of a substrate 2 (e.g. copper) may be polished to produce a surface suitable for the production of an optically flat polished surface 8. In achieving this some material 12 is removed from the substrate 2.

Next, a frusto-conical opening 14 having an included angle 20 of approximately 60 degrees is machined into the face 16 of the substrate, opposite the surface on which will be formed the optically flat polished surface 8, at the location of the aperture. This machining may conveniently carried out by an end milling cutter. The opening 14 is substantially greater in cross-section than the diameter of the very thin section 6 thereby to facilitate the subsequent method steps.

A second machining step is then carried out to produce a frusto-conical opening 18, extending below the bottom of the opening 14 and of somewhat smaller size than the frusto-conical opening 14.

Following this second machining step, the thickness of the material of the substrate 2, between the surface to be formed into the optically flat polished surface and the bottom of the frusto-conical opening 18 may, for example, be from about 0.006 inches (0.15 mm) to about 0.008 inches (0.20 mm). This will, of course, depend upon the ultimate desired thickness of the very thin section 6. In addition, the diameter of the floor of the frusto-conical opening 18 will depend upon the desired diameter of the very thin section 6.

These machining steps produce severe stresses in the substrate, adjacent the machined openings. These stresses, if allowed to remain or if the machining too closely approaches the surface on which will be formed the optically flat polished surface, will result in an unacceptable distortion in the optically flat polished surface when formed. These stresses may be relieved by cryogenically or thermally stress relieving the substrate. Together with or after such stress relief, an etchant may be introduced into the openings 14, 18 to remove surface material, thereby assisting in or completely removing machine created stresses. Etching is preferably carried out in two stages, in the first of which machine marks and stresses left after cryogenic or thermal stress relief of the machined surfaces are etched to leave a somewhat thicker very thin section 6 than as desired with a subsequent polishing step being used to remove material 12 to further reduce the thickness of the very thin section 6 and in the second of which, etching is, after polishing to produce an optically flat surface 8, used on the fully stressed relieved structure to gently reduce the thickness of the very thin section 6 to that desired for the application concerned and for the formation of the aperture therethrough without disturbing the integrity of the optically flat polished surface so produced. This thickness, for example, may be from about 0.002 inches (0.05 mm) to about 0.008 inches (0.20 mm). When the desired material has been removed by etching, the etchant is removed and the etching process terminated. It will be appreciated that the very thin section 6 need not be of an exact thickness, it only being necessary for the material to be rendered thin enough for the cutting of the aperture without disturbing the optically flat polished surface.

Once the very thin section 6 has been produced, the micro-aperture 4 of a desired cross-sectional shape and size, as required by the application for which the structure is intended, is cut by a laser cutting process which process will not be described here in detail as such a process is well known to those skilled in the art.

Thus the method may be summarized as a) providing a substrate suitable for the formation of an optically flat surface thereon, b) machining a recess at a location of an aperture opposite the surface, c) stress relieving the substrate, d) polishing the surface to form the optically flat surface, e) etching the recess to produce a very thin section of the substrate, and f) laser cutting the aperture through the very thin section.

As mentioned at the beginning of this detailed description, certain of the process steps may be omitted in the production of certain structures independence upon the intended application. For example, the two machining steps may be combined into a single step where appropriate or may be eliminated entirely in favor of the use of an etchant acting from the surface 16 to produce the very thin section 6 entirely without mechanical machining. Further, the optically flat polished surface 8 may be aluminized or otherwise coated in a manner known to those skilled in the art to produce an appropriately reflective surface. In addition, in certain circumstances, the optically flat surface may be formed prior to the formation of the recess.

Any minor material residue resulting from the laser cutting, adjacent the aperture on the polished surface, may be polished away to remove the residue. Alternatively, the site of the aperture to be formed on the polished surface may be coated with an acrylic or other suitable substance to capture any residue resulting from the laser cutting. This coating may then be removed by the use of heat or chemical action chosen so as not to disturb the optical flatness and integrity of the polished surface.

Thus by the process of the present invention, an etchant is used to selectively and gently remove support material from the substrate 2 to form the very thin section 6 remote from the polished surface 8 to leave a very thin unsupported area with optical flatness qualities of the polished surface 8 which are essentially undisturbed and uninterrupted in this unsupported area in which the aperture is subsequently formed.

In order to control the depth of etching in the region of the very thin section 6, the substrate 2 may include, at or adjacent the optically flat polished surface 8, a barrier layer of material which will control the depth of the etching process.

I claim:

1. A method of producing a micro-aperture extending from an optically flat surface through a substrate defining the optically flat surface to a surface of the substrate remote from the optically flat surface comprising the steps of:
   a) forming the optically flat surface;
   b) etching the substrate to form the remote surface to produce an area of the substrate of a desired thinness bounded by the optically flat surface and the remote surface; and
   c) laser cutting through the area of desired thinness to produce the aperture, of a desired shape and size.

2. A method according to claim 1 further comprising the step of:
   d) prior to step a), machining a recess in the substrate at the location of the area.

3. A method according to claim 2 further comprising the step of:
   e) prior to step a), stress relieving the substrate to relieve machine stresses created during machining to form the recess.

4. A method according to claim 3 further comprising the step of:
   f) prior to step a), etching the recess in the stress relieved substrate to remove machine mark stresses.

5. A method according to claim 1, wherein the laser cutting is from the remote surface toward the optically flat surface.

6. A method according to claim 2 wherein step (d) comprises machining the recess in at least two stages commencing with a large relatively shallow recess having a bottom surface followed by at least one further machining step to produce at least one secondary and smaller recess in the bottom surface.

7. A method according to claim 1 further comprising the step of providing a removable material on the optically flat surface to receive residue from step c) and subsequently removing the removable material with the received residue thereby preserving the integrity of the optically flat surface adjacent the aperture.

8. A method of producing an aperture extending from an optically flat surface through a substrate defining the optically flat surface to a surface of the substrate remote from the optically flat surface comprising the steps of:

a) machining a recess in the remote surface of the substrate at a location at which the aperture is desired;

b) stress relieving the substrate to relieve machine stress created during the machining of the recess;

c) etching the recess to remove machine marks and recess disconformities;

d) polishing the substrate to form the optically flat surface;

e) etching an innermost surface of the recess to form an area of desired thinness between the optically flat surface and the surface remote therefrom; and f) laser cutting the area of desired thinness from the remote surface toward the optically flat surface to produce the aperture of a desired shape and size.

9. A method according to claim 8, wherein the recess is frusto-conical.

* * * * *